Feb. 21, 1939. F. L. SCOTT 2,147,926
FOUR-CONE BIT
Filed Dec. 7, 1936

Floyd L. Scott
INVENTOR

BY Jesse R. Stone
ATTORNEY

Patented Feb. 21, 1939

2,147,926

UNITED STATES PATENT OFFICE 2,147,926

FOUR-CONE BIT

Floyd L. Scott, Houston, Tex., assignor to Hughes Tool Company, Houston, Tex., a corporation of Delaware Application December 7, 1936, Serial No. 114,566

7 Claims. (Cl. 255—71)

My invention relates to well drills and particularly to drills whereon the cutters are of conical shape and surround the ends of downwardly inclined cutter shafts.

It is an object of the invention to provide a type of drill having four cone cutters mounted in symmetrically spaced relation so as to have a balanced drilling action, with a minimum of vibration in use.

I desire to obtain a maximum of cutting surface acting upon the outer and gage cutting portion of the drill and to also effectively cut the central area of the hole.

It is also an object to obtain a more efficient cutting action by offsetting the axes of the cutters relative to the axis of rotation of the drill.

I further aim to take up the longitudinal outward thrust on such offset cutters by the provision of a wear-resisting member at the smaller end of the cutter shaft and cutter.

I desire to provide a smoothly running drill which will drill a straight hole and also be strong and not liable to failure.

Figure 1:
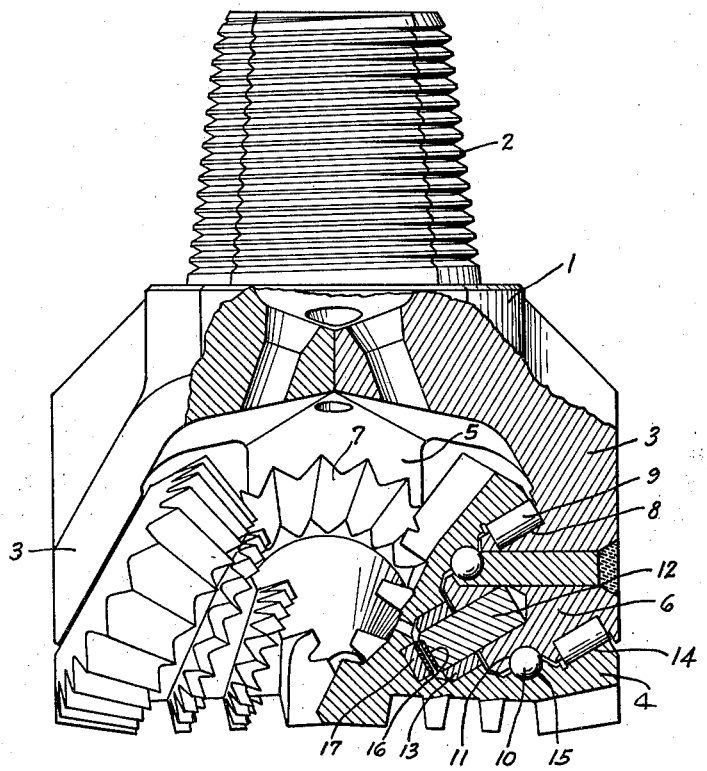

In the drawing herewith Fig. 1 is a side view of a well drill embodying the invention, with parts broken away and shown in section.

Figure 2:
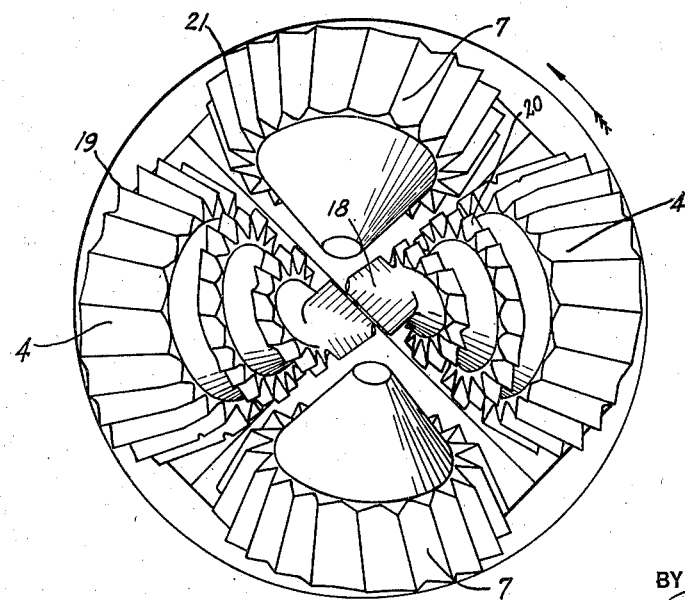

Fig. 2 is a bottom plan view of the drill.

I have shown the invention applied to a drill having a head 1 provided with an upwardly tapered and threaded shank 2 for engagement with a drill collar. Said head is longitudinally divided and has four legs thereon arranged in opposite pairs. One pair 3, 3 are constructed to support cutters 4, 4 which are toothed throughout their conical surface. The other pair 5 are similarly formed at points spaced 90° from the shafts 6 of cutters 4, and form supports for cutters 7, 7, which are toothed only at their outer, larger ends.

The shafts and bearings for all the cutters are formed alike and will be understood from Fig. 1. The shafts project inwardly and downwardly from the legs and are reduced in diameter inwardly by steps. The outer, larger area has cylindrical raceways 8 therein to receive rollers 9. The next intermediate and smaller area has therein an annular raceway 11 for the retaining balls 10.

The smaller end area of the shaft is made of harder metal set into the end of the main body of the shaft. It comprises a cylindrical pin 12 of hard steel driven into a recess in the end of the shaft. It has a ring or bushing 13 of hard bearing metal thereon and the outer extremity of the pin has a hard facing metal set therein at 16 to take up the end thrust thereon. This metal may be Stellite or other similar hard alloy to resist wear upon the shaft in use.

The cutters are each provided with an inner bearing area surrounding the shaft and shaped to fit thereon. Each cutter has raceways at 14 and 15 to bear upon the bearings 9 and 10 respectively. There is also a cylindrical bearing area to engage the bushing 13. Opposed to the wear-resisting end 16 of the shaft, I set a button or plate 17 into the cutter shell. The inner face of this button is also hard faced to bear against the end of the shaft and resist wear due to the strong outward thrust which results from the rotation of the offset cutters.

The shafts for the cutters are not pointed inwardly directly toward the axis of rotation, but are offset somewhat so that the inner end is directed slightly forward from the axis, as the drill head is rotated in the usual right-hand direction of rotation.

The cutters 4 have a conical shape and are tapered to come to an apex at a point beyond the axis of rotation of the drill. Thus the forward ends 18 overlap each other and cut the center of the hole as the drill is operated. There is an elongated row of teeth 19 at the outer or base portions of the cutter to cut the bottom of the hole adjacent the wall of the well. Between the row 19 and the forward cutting ends 18 there is a spiral row of teeth 20 which cuts the intermediate portion of the well bottom and, because of its spiral-form, the teeth cannot track with the impressions on well bottom formed by other teeth.

The two cutters 7 are positioned at intermediate points spaced 90° from the cutters 4. The interior bearings are the same as has been described relative to said other cutters. The cutters are provided to assist in cutting the larger diameter of the well bottom and also to furnish a support for the drill during rotation. The cutters together thus provide a four point rolling contact with the bottom of the well so that a smooth even action is obtained. Furthermore the drill is not so prone to be deflected by contact with sloping strata of rock in drilling and thereby a more nearly straight hole is produced. The teeth 21 upon the cutters 7 are in a single row at the base of the cutter and these teeth may, if desired, be inclined away from the line parallel with the cutter axis as shown. This will assist in preventing the said teeth from tracking with the imprints of teeth 19 on the cones 4. The forward or smaller ends of the cutters 7 have no teeth but act simply as a housing for the bearings of these cutters upon the shaft. I thus obtain a strong anti-friction bearing for these cutters 7 housed and protected as in the case of the cutters 4. These cutters are also pointed so that their apices are forward of the axis of rotation as the drill is operated.

In operation this drill will cut a straight hole and will operate with a minimum of vibration. As the cutters are offset relative to the axis of rotation of the drill, there is a strong outward thrust on each cutter. This prevents the cutters from moving together when the bearings become worn. Also the wear upon the bearings will be taken up by the wear-resisting areas formed at 16 and 17. For it will be seen that these surfaces contact as soon as wear on the rolling bearings becomes appreciable. The bearings will therefore endure until the toothed cutting surface has become worn out.

It will be obvious that this invention is independent of features of construction of the head and other elements generally known to be old. The head need not be longitudinally divided, for example, nor the short cutters offset, nor the roller bearings arranged as shown. The invention resides particularly in the construction of a drill with four cone cutters each of which is similarly supported, but two of which overlap at the center. A smoothly running drill is thus obtained.

What I claim as new is:

1. A well drill, four shafts thereon, conical shaped cutters surrounding the ends of said shafts and rotatable thereon, the ends of two of said cutters projecting past the central axis of rotation of the drill.

2. A well drill, four forwardly and downwardly projecting shafts thereon, each shaft being offset from a true radial position, conical cutters enclosing the ends of said shafts and rotatable thereon, two of said cutters projecting past the axial center of the drill and overlapping.

3. A well drill, four forwardly and downwardly projecting shafts thereon, each shaft being offset from a true radial position, conical cutters enclosing the ends of said shafts and rotatable thereon, two opposed cutters having their smaller ends extending past the center of the drill and overlapping, the overlapping portion being toothed.

4. A well drill, four forwardly and downwardly projecting shafts thereon, each shaft being offset from a true radial position in a direction forwardly of the axis of rotation as the drill is operated, conical cutters enclosing the ends of said shafts and rotatable thereon, two of said cutters projecting past the axial center of the drill and overlapping.

5. A well drill, two pairs of opposed cutter shafts thereon, conical shaped cutters enclosing the ends of said shafts and having bearings thereon, the cutters on one of said pairs of shafts being extended to come to an apex beyond the axis of rotation and positioned to overlap, and teeth along the full length of said overlapping cutters, the cutters on the other pair of shafts having teeth adjacent their bases only.

6. A well drill, two pairs of opposed cutter shafts thereon, conical shaped cutters enclosing the ends of said shafts and having bearings thereon, the cutters on one of said pairs of shafts being extended to come to an apex beyond the axis of rotation and positioned to overlap, and teeth along the full length of said overlapping cutters, a single row of teeth adjacent the base of each of the other cutters, the forward ends of said cutters being untoothed and positioned out of contact with the well bottom in use.

7. A well drill, four cutter shafts thereon, approximately conical shaped cutters enclosing the ends of said shafts, each of said shafts being offset from a radial direction, the smaller ends of one opposed pair of cutters being extended past the center of the drill.

FLOYD L. SCOTT.